US012531897B2

(12) United States Patent
DeLeskie et al.

(10) Patent No.: US 12,531,897 B2
(45) Date of Patent: Jan. 20, 2026

(54) DYNAMIC TIME SLICE AUTOENCODER NETWORK ANOMALY DETECTION

(71) Applicant: Oracle International Corporation, Redwood Shores, CA (US)

(72) Inventors: James Patrick DeLeskie, Miami, FL (US); Stephen Foster Manley, Doral, FL (US)

(73) Assignee: Oracle International Corporation, Redwood Shores, CA (US)

( * ) Notice: Subject to any disclaimer, the term of this patent is extended or adjusted under 35 U.S.C. 154(b) by 148 days.

(21) Appl. No.: 18/591,907

(22) Filed: Feb. 29, 2024

(65) Prior Publication Data

US 2025/0280034 A1    Sep. 4, 2025

(51) Int. Cl.
*H04L 9/40* (2022.01)

(52) U.S. Cl.
CPC .............................. *H04L 63/1458* (2013.01)

(58) Field of Classification Search
CPC .................................................. H04L 63/1458
See application file for complete search history.

(56) References Cited

U.S. PATENT DOCUMENTS

| 12,088,611 | B1 * | 9/2024 | Lin | H04L 63/20 |
| 12,199,997 | B1 * | 1/2025 | Lin | H04L 41/22 |
| 12,267,345 | B1 * | 4/2025 | Erlingsson | G06F 9/5072 |
| 2018/0176232 | A1 * | 6/2018 | Rodriguez | H04L 61/4511 |
| 2020/0112574 | A1 * | 4/2020 | Koral | G06F 16/245 |
| 2020/0195669 | A1 * | 6/2020 | Karasaridis | H04L 63/10 |
| 2021/0112091 | A1 * | 4/2021 | Compton | H04L 63/1416 |
| 2025/0016181 | A1 * | 1/2025 | Herszfang | G06F 11/0709 |
| 2025/0106230 | A1 * | 3/2025 | Du | H04L 63/1441 |
| 2025/0130910 | A1 * | 4/2025 | Meyuhas | G06F 11/3006 |
| 2025/0150353 | A1 * | 5/2025 | Cherkas | G06F 21/554 |

OTHER PUBLICATIONS

Mirsky et al., "Kitsune: An Ensemble of Autoencoders for Online Network Intrusion Detection", Available Online at: https://arxiv.org/pdf/1802.09089, Feb. 25, 2018, 15 pages.

(Continued)

*Primary Examiner* — Stephen T Gundry
(74) *Attorney, Agent, or Firm* — Kilpatrick Townsend & Stockton LLP

(57) ABSTRACT

Techniques are provided for dynamic time slice autoencoder network anomaly detection. A method for dynamic time slice autoencoder network anomaly detection can include generating data from a router connecting a plurality of IP addresses in at least one network to a public network, generating a plurality of visual representations of the data, ingesting each of the visual representations of the data into a unique autoencoder corresponding to a time frame of the ingested visual representation, aggregating the values from the autoencoders, and identifying a Denial-of-service (DDOS) attack based on the aggregated values from the autoencoders. Each of the plurality of visual representations of the data can be generated for one of a plurality of predetermined time frames. The data can characterize attributes of traffic passing through the router. The autoencoder can be trained to output a value indicating that the ingested visual representation contains one of anomalous or non-anomalous activity.

20 Claims, 10 Drawing Sheets

(56) References Cited

OTHER PUBLICATIONS

International Application No. PCT/US2025/017350, International Search Report and Written Opinion, Mailed on Apr. 14, 2025, 15 pages.

Salahuddin et al., "Chronos: DDoS Attack Detection Using Time-Based Autoencoder", Institute of Electrical and Electronics Engineers Transactions on Network and Service Management, vol. 19, No. 1, Mar. 11, 2022, pp. 627-641.

Wei, "Reconstruction-Based LSTM-Autoencoder for Anomaly-Based DDoS Attack Detection Over Multivariate Time-Series Data", Journal of Latex Class Files, vol. 14, No. 8, Available Online at: https://arxiv.org/pdf/2305.09475, Aug. 2021, 13 pages.

Autoencoder for Network Anomaly Detection, 2022 IEEE International Symposium on Measurements & Networking (M&N), Available online at https://ieeexplore.ieee.org/document/9887691, Jul. 18-20, 2022, pp. 1-4.

FortiDDoS—DDoS Protection Solution, Fortinet, Available online at https://www.fortinet.com/products/ddos/fortiddos, Accessed from Internet on Jun. 15, 2023, pp. 1-10.

Global Leader of Cybersecurity Solutions and Services, Fortinet, Available online at https://www.fortinet.com, Accessed from Internet on May 24, 2023, pp. 1-8.

Network Security Solutions for Enterprise, Fortinet, Available online at https://www.fortinet.com/solutions/enterprise-midsize-business/network-security, Accessed from Internet on Jun. 15, 2023, pp. 1-12.

What is DDoS Protection and Mitigation?, Fortinet, Available online at https://www.fortinet.com/resources/cyberglossary/ddos-protection, Accessed from Internet on Jun. 15, 2023, pp. 1-5.

Khandelwal, Anomaly Detection using Autoencoders, Perform fraud detection using Autoencoders in TensorFlow, Jan. 21, 2021, pp. 1-20.

* cited by examiner

DYNAMIC TIME SLICE AUTOENCODER NETWORK ANOMALY DETECTION

BACKGROUND

The present disclosure relates generally to Denial-of-service (DDOS) attack detection.

A denial-of-service attack (DOS attack) is a type of cyber-attack in which the perpetrator seeks to make a machine or network resource unavailable to its intended users by temporarily or indefinitely disrupting services of a host connected to a network. Denial of service is typically accomplished by flooding the targeted machine or resource with superfluous requests in an attempt to overload systems and prevent some or all legitimate requests from being fulfilled.

Present solutions for detecting DDOS attacks are cumbersome, slow, and time-consuming. Accordingly, further improvements to anomaly detection are desired.

BRIEF SUMMARY

Techniques are provided (e.g., a method, a system, non-transitory computer-readable medium storing code or instructions executable by one or more processors) herein for dynamic time slice autoencoder network anomaly detection. One aspect relates to a method. The method includes generating data from a router connecting a plurality of IP addresses in at least one network to a public network, generating a plurality of visual representations of the data, ingesting each of the visual representations of the data into a unique autoencoder corresponding to the time frame of the ingested visual representation, aggregating the values from the autoencoders, and identifying a Denial-of-service (DDOS) attack based on the aggregated values from the autoencoders. In some embodiments, each of the plurality of visual representations of the data is generated for one of a plurality of predetermined time frames. In some embodiments, the data characterizes attributes of traffic passing through the router. In some embodiments, the autoencoder can be trained to output a value indicating that the ingested visual representation contains one of anomalous activity or non-anomalous activity.

In some embodiments, the autoencoder is trained for the predetermined time frame of the ingested visual representation. In some embodiments, the autoencoders can include at least one of: a convolutional neural network (CNN) autoencoder; or a Long Short-Term Memory (LSTM) autoencoder. In some embodiments, each of the plurality of visual representations of the data can be a time series graph. In some embodiments, each of the autoencoders can be trained on data characterizing the attributes of traffic passing through the router and to the plurality of IP addresses.

In some embodiments, the traffic passing through the router can include inbound traffic. In some embodiments, the traffic can include outbound traffic. In some embodiments, the traffic can include both inbound traffic and outbound traffic.

In some embodiments, aggregating the values from the autoencoders can include applying a weighting value to at least some of the values from the autoencoders. In some embodiments, the weighting value applied to a value from an autoencoder is linked to that autoencoder. In some embodiments, at least some of the autoencoders are trained to identify anomalous activity and at least some of the autoencoders are trained to identify normal activity.

In some embodiments, the time frames can include at least a first time frame of between 1 second and 59 minutes, a second time frame of between 1 hour and 24 hours, a third time from of between 1 day and 7 days, and/or a time frame of at least one week. In some embodiments, the attributes of traffic passing through the router include at least one of a packet size, a packet distribution, a bandwidth, packet protocol distribution, packet sources, and/or packet destinations.

In some embodiments, the method includes identifying a portion of the plurality of visual representations corresponding to the DDOS attack, and providing the visual representations to a user. In some embodiments, the plurality of IP addresses comprises between 255 and 65,000 IP addresses. In some embodiments, each of the autoencoders can have 3 or fewer layers. In some embodiments, each of the autoencoders generates a vector having between 2 and 4 elements.

In some embodiments, the autoencoders include a subset of autoencoders each corresponding to the same time frame. In some embodiments, each of the subset of autoencoders is trained to output a value indicating that the ingested visual representation contains one of anomalous activity or non-anomalous activity for a unique attribute of traffic passing through the router.

One aspect relates to a system. The system includes memory including processor-executable stored instructions, and a processor. The processor can execute the stored instructions to generate data from a router connecting a plurality of IP addresses in at least one network to a public network, generate a plurality of visual representations of the data, ingest each of the visual representations of the data into a unique autoencoder corresponding to the time frame of the ingested visual representation, aggregate the values from the autoencoders, and identify a Denial-of-service (DDOS) attack based on the aggregated values from the autoencoders. In some embodiments, the data characterizes attributes of traffic passing through the router. In some embodiments, each of the plurality of visual representations of the data is generated for one of a plurality of predetermined time frames. In some embodiments, the autoencoder can be trained to output a value indicating that the ingested visual representation contains one of anomalous activity or non-anomalous activity.

One aspect of the present disclosure relates to a non-transitory computer-readable storage medium storing a plurality of instructions executable by one or more processors. When executed by the one or more processors, the plurality of instructions cause the one or more processors to generate data from a router connecting a plurality of IP addresses in at least one network to a public network, generate a plurality of visual representations of the data, ingest each of the visual representations of the data into a unique autoencoder corresponding to the time frame of the ingested visual representation, aggregate the values from the autoencoders, and identify a Denial-of-service (DDOS) attack based on the aggregated values from the autoencoders. In some embodiments, the data characterizes attributes of traffic passing through the router. In some embodiments, each of the plurality of visual representations of the data is generated for one of a plurality of predetermined time frames. In some embodiments, the autoencoder can be trained to output a value indicating that the ingested visual representation contains one of anomalous activity or non-anomalous activity.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

A Denial-of-service (DDOS) attack is typically accomplished by flooding the targeted machine or resource with superfluous requests in an attempt to overload systems and prevent some or all legitimate requests from being fulfilled. When successful, a DDOS attack can prevent legitimate users from accessing services and can shutdown the provision of services for an extended period of time.

DDOS attack are presently detected via thresholding that indicates the occurrence of a DDOS attack when traffic exceeds some threshold level. Although thresholding can be effective, thresholding can result in a significant number of both false-positives in which benign traffic is identified part of an attack, and false-negatives in which malicious traffic is identified as normal.

The present seeks to address these shortcomings via use of a large number of evaluators, which can be autoencoders, to distinguish between malicious and non-malicious traffic. In contrast to general trends in technology, it has been surprisingly discovered that the user of smaller, less complex autoencoders produces better results than the use of larger, more complex autoencoders. As such, the present utilizes multiple autoencoders, each with unique training, to evaluate different portions of data characterizing traffic through a router. This can include, having different autoencoders for different time frames and/or for different attributes of the traffic.

Further, through the use of a number of small autoencoders, implementations as disclosed herein provide the benefit of facilitating: the identification of data indicating the malicious traffic; the reason for identifying data as indicating malicious traffic; source of malicious traffic; and/or the like.

Thus, via the use of a larger number of small autoencoders, implementations as disclosed herein are able to more accurately identify malicious traffic, can provide users better insight into the detection of the malicious traffic, and can facilitate in blocking malicious traffic.

Figure 1:
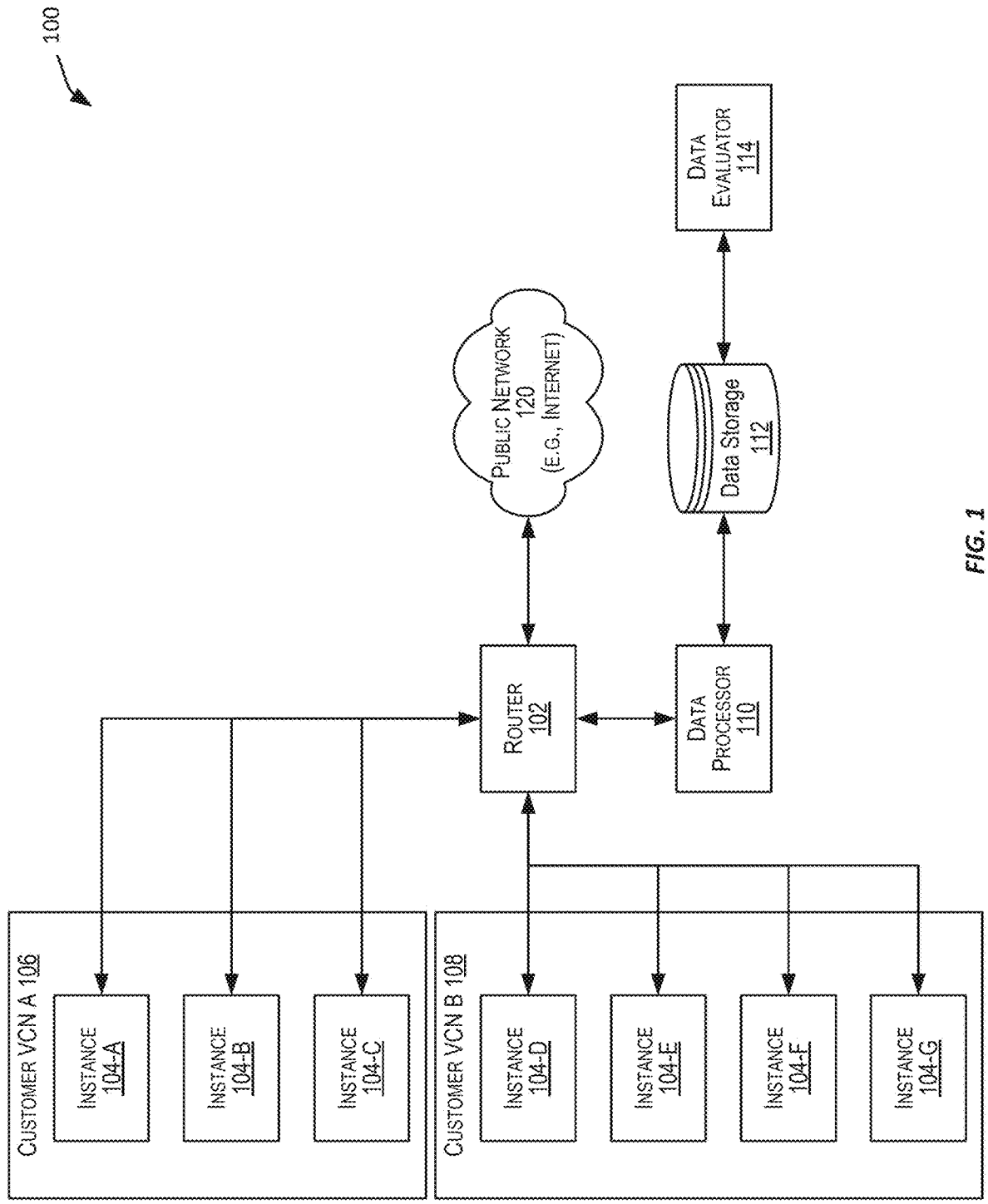
FIG. 1 is a schematic depiction of one embodiment of an attack detection system.

With reference now to FIG. 1, a schematic illustration of one embodiment of an attack detection system 100 is shown. The system 100 can be configured to monitor traffic through one or several routers and, based on monitoring of this traffic, identify an attack such as a Denial-of-service (DDOS) attack.

The system 100 can include a router 102. The router 102 can, in some embodiments, comprise a gateway router, a Border Gateway Protocol (BGP) router, or any other desired type of router 102. The router 102 can be configured to connect one or several instances 104, each of which instances 104 can have an associated address such as an associated IP address, MAC address, and/or the like to a communications network such as a public network 120. This public network 120 can be, in some embodiments, the internet.

In some embodiments, the instances 104 can include one or several compute instances which can be instantiated on one or several virtual machines, bare metal machines, or the like. In some embodiments, these instances 104, in aggregate, can be associated with a block of IP addresses, which can include any number of IP addresses including, for example, between 10 and 1,000,000 IP address, between 100 and 500,000 IP address, between 200 and 100,000 IP addresses, between 255 and 65,000 IP address, or any other or intermediate number of IP addresses. In some embodiments, each instance 104 can be associated with one or several unique IP addresses.

In some embodiments, instances 104 serviced by the router 102 can all be within a single network, subnet, virtual cloud network (VCN), or the like. By way of example, in some embodiments, a first set of instances 104-A, 104-B, 104-C are located in a first VCN 106, also referred to herein as VCN A 106, and a second set of instances 104-D, 104-E, 104-F, 104-G are located in a second VCN 108, also referred to herein as VCN B 108. In some embodiments, some or all of the instances 104 serviced by the router can belong to the same user, can be in the same user tenancy, can belong to the same service, and/or the like.

In some embodiments, and as depicted in FIG. 1, the system 100 can include a data processor 110. The data processor 110 can be a processor that can be configured to generate one or several visual representations of data relating to traffic through the router 102. In some embodiments, this can include generating a visual representation corresponding to all of the traffic through the router 102 and/or for some of the traffic through the router 102. In some embodiments, for example, the visual representation can correspond to traffic through the router 102 and to some or all of the instances 104.

The data processor 110 can, in some embodiments, receive the data relating to traffic through the router 102, parse the data by time frame and attribute, and generate one or several visual representations for one or more time frames. In some embodiments, a plurality of visual representations can be generated for each of the time frames, each of the plurality of visual representations depicting a different attribute of the data relating to traffic through the router 102.

In some embodiments, the data processor 110 can be configured to monitor traffic through the router 102. This can include monitoring inbound traffic, monitoring outbound traffic, monitoring both inbound and outbound traffic, and/or the like. In some embodiments, the data processor 110 can receive information from the router 102 corresponding to traffic through the router 102 and to and/or from one or several instances 104 and/or IP addresses. This data can be received according to a push model, a pull model, a pub/sub model, and/or the like. The data processor 110 can, in some embodiments, monitor traffic through the router 102 based on information received from the router 102.

In some embodiments, the data processor 110 can be further configured to parse the data from the router 102. This can include identifying and/or extracting data relevant to one or several time frames, variables, attributes, and/or the like. In some embodiments, for example, these time frames can include a first time frame, also referred to as a minutes time frame, a second time frame, also referred to herein as an hours time frame, a third time frame, also referred to herein as a days time frame, a fourth time frame, also referred to herein as a weeks time frame, fifth time frame, also referred to herein as a months time frame, and a sixth time frame, also referred to herein as a years time frame. In some embodiments, the first time frame can have a duration of between 1 second and 59 minutes, the second time frame can have a duration of between 1 hour and 24 hours, the third time frame can have a duration of between 1 day and 7 days, the fourth time frame can have a duration of at least one week and/or of between one week and 52 weeks, the fifth time frame can have a duration of between one month and twelve months, and the sixth time frame can have a duration of at least one year.

In some embodiments, the data processor 110 can be further configured to parse the data from the router 102 according to one or several variables and/or attributes of the traffic passing through the router 102. These attributes can include, for example, at least one of: packet size, packet distribution, traffic bandwidth, packet protocol, packet protocol distribution, packet source, packet destination, J-flow, Netflow, sampled flow (sFLow), and/or the like.

The data processor 110 can, in some embodiments, be configured to generate a plurality of visual representations of the data from the router 102. In some embodiments, each of these visual representations can comprises a graph such as, for example, a time-series graph. In some embodiments, each of these visual representations can correspond to one of the time frames, thus, in some embodiments, one or several visual representations of all or portions of the data can be generated for the first time frame, one or several visual representations of all or portions of the data can be generated for the second time frame, one or several visual representations of all or portions of the data can be generated for the third time frame, one or several visual representations of all or portions of the data can be generated for the fourth time frame, one or several visual representations of all or portions of the data can be generated for the fifth time frame, and/or one or several visual representations of all or portions of the data can be generated for the sixth time frame. For example, in an embodiment in which data is being captured, after data has been captured for a duration corresponding to the first time frame, one or several visual representations of that data can be generated for the first time frame. Likewise, after sufficient data has been captured for a duration corresponding to each of the other time frames, one or several visual representations of that data can be generated for each of the other time frames.

Figure 4A:
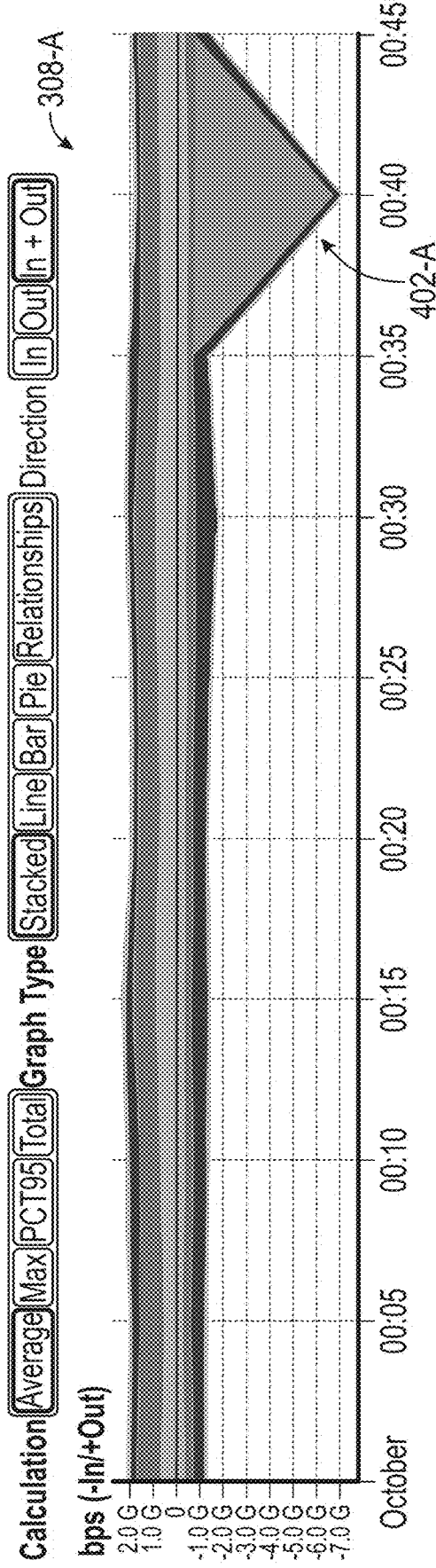
FIG. 4 is a depiction of embodiments of a visual representation.
Figure 4B:
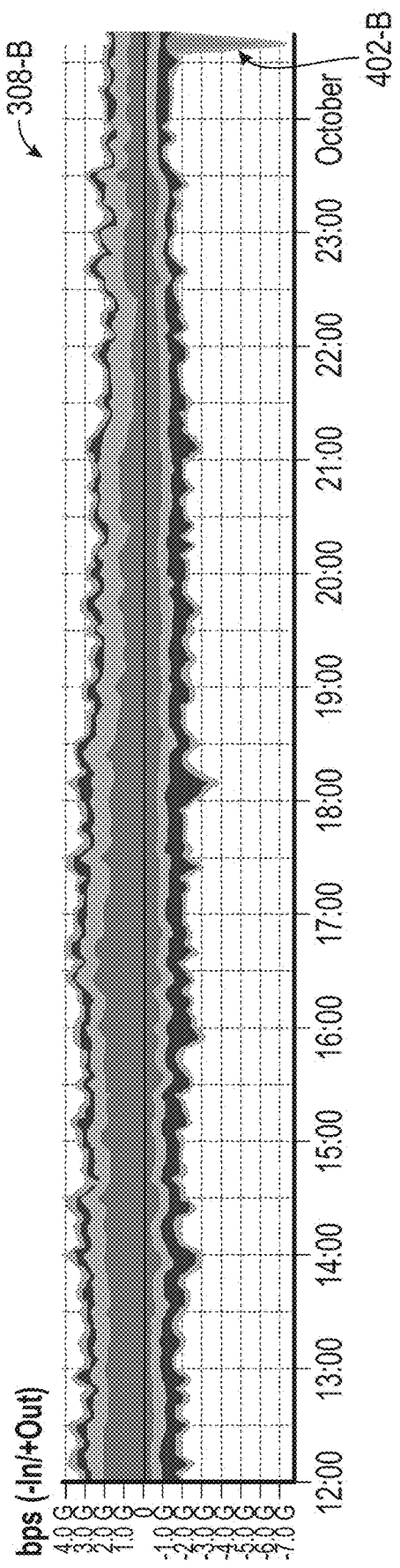

In some embodiments, these visual representations can be generated such that the visual representations of one of the time frames partially overlaps other visual representations of that time frame or alternatively does not wholly or partially overlap other visual representations of that time frame. Embodiments of such visual representations are shown in FIG. 4 and will be discussed at further length below.

In some embodiments, the visual representations can be stored in data storage 112. Data storage 112 can comprise memory that can include one or several databases. In some embodiments, for example, these databases can include one or several databases for each set of instances 104 for which a visual representation is generated. In some embodiments, a plurality of databases generated for a set of instances 104 can further include one or several databases each corresponding to an attribute of the traffic through the router 102.

The system 100 can further include a data evaluator 114. The data evaluator 114 can comprise processing capability, which can be in the form of one or several processors, configured to execute computer code to identify anomalous and/or non-anomalous activity. Specifically, the data evaluator 114 can be configured to identify anomalous and/or non-anomalous traffic through the router 102 and thereby identify a DDOS attack. In some embodiments, the data evaluator 114 can be further configured to identify portions of one or several of the visual representations corresponding to the DDOS attack, and providing these portions of the visual representations to a user. In some embodiments, the data evaluator 114 can be further configured to identify sources of the DDOS attack, and more specifically to identify source addresses of sources of the DDOS attack, and to block traffic from the sources of the DDOS attack.

Figure 2:
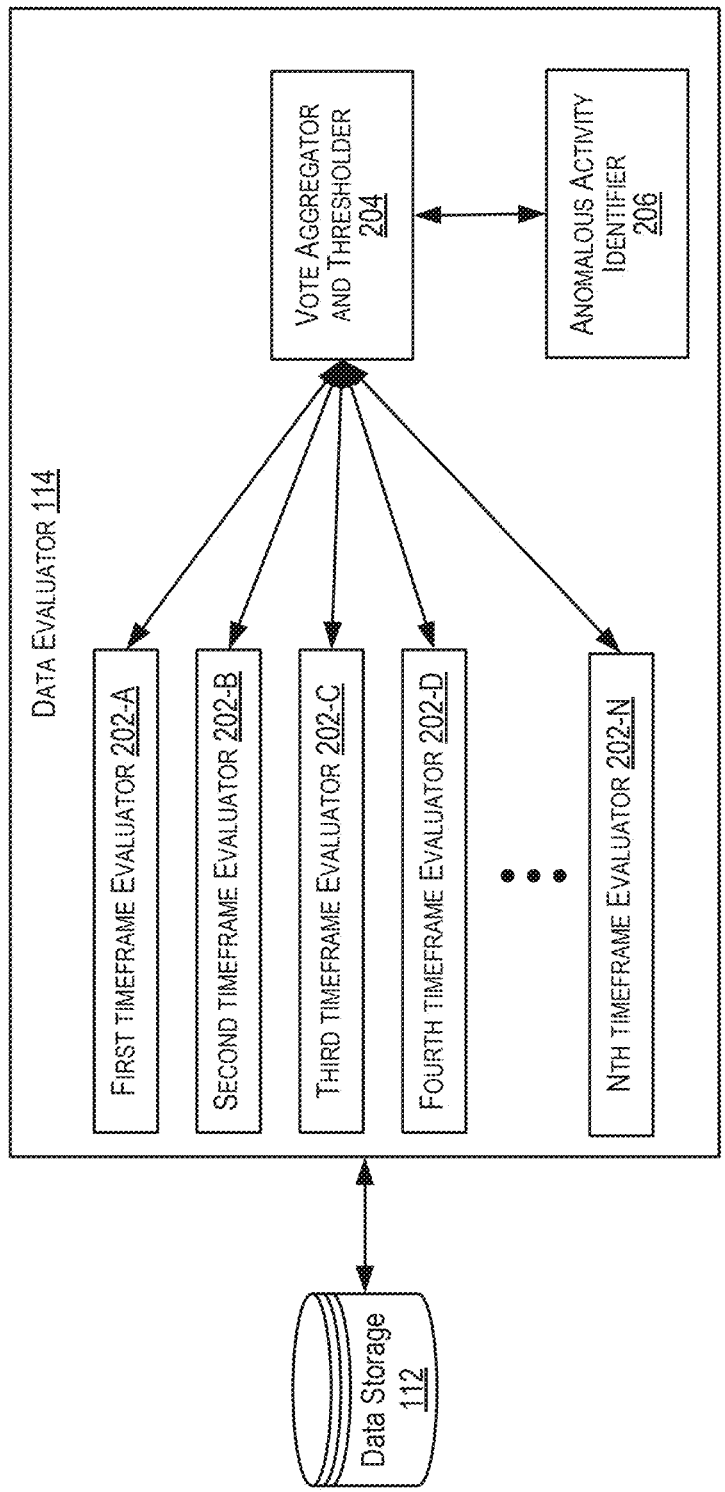
FIG. 2 is a schematic depiction of the data storage 112 and the data evaluator.

With reference now to FIG. 2, a schematic illustration of the data storage 112 and the data evaluator 114 is shown. As seen, the data evaluator 114 can receive data, and specifically can receive the visual representations from the data storage 112. The data evaluator 114 can select a visual representation, identify an evaluator 202 corresponding to that visual representation, ingest the visual representation into the evaluator 202, and receive an output from the evaluator 202. This can be performed with each visual representation resulting in the generation of a plurality outputs from different evaluators 202. These outputs can be aggregated by the data evaluator 114, and can be combined. The combination of these outputs can be used to determine whether the traffic through the router is indicative of anomalous activity.

As seen in FIG. 2, the data evaluator 114 can comprise a plurality of evaluators 202. These evaluators 202, can each be specific to a time frame (time frame evaluator 202), can be specific to a time frame and an attribute of the traffic through the router 102, can be specific to an attribute of the router 102, or the like. In some embodiments, each evaluator 202 can be configured to ingest and/or evaluate a portion of data corresponding to traffic through the router 102, and to generate a value indicating whether the ingested data contain anomalous or non-anomalous activity.

In some embodiments, the evaluators 202 can identify traffic as containing either anomalous or non-anomalous activity via application of one or several rules or heuristics to the data corresponding to the traffic.

In some embodiments, each of these evaluators 202 can comprise an autoencoder. In some embodiments, each autoencoder can be specific to a time frame, to an attribute of traffic through the router 102, and/or to a time frame and an attribute of traffic through the router 102. In some embodiments, each autoencoder can be trained to output a value indicating whether an ingested visual representation contains anomalous activity or non-anomalous activity. In some embodiments, some or all of the autoencoders can be trained to identify anomalous traffic activity, and/or some or all of the autoencoders can be trained to identify non-anomalous activity, or in other words, normal activity.

In some embodiments, for example, each autoencoder can be trained for the predetermined time frame of the corresponding ingested visual representation. In some embodiments, each of the autoencoders can be trained on data characterizing attributes of traffic passing through the router and to the plurality of IP addresses. In some embodiments, each of the autoencoders can comprise at least one of: a convolutional neural network (CNN) autoencoder; or a Long Short-Term Memory (LSTM) autoencoder.

The data evaluator 114 can further include a vote aggregator and thresholder 204, also referred to herein as the aggregator 204. The aggregator 204 can be configured to aggregate values output by the evaluators 202 that characterize whether the traffic activity is anomalous or non-anomalous. The aggregator 204 can be further configured to apply a weighting value to at least some of the values received from the evaluators 202. In some embodiments, each evaluator 202 can have a weighting value, or in other words, the weighting value can be linked to the evaluator 202. In some embodiments, this weighting value can characterize a relative level of trust associated with the evaluator 202. In other words, the weighting value can characterize the degree to which the output of the evaluator 202 accurate identifies traffic activity in the router 102 as either anomalous or non-anomalous. In some embodiments, a more trustworthy evaluator 202 can have a larger weighting value, and a relatively less trustworthy evaluator 202 can have a smaller weighting value.

The aggregator 204 can identify each received value, can identify the weighting value associated with the evaluator 202 from which the value was received, and can apply the weighting value to the value received from the evaluator 202. Thus, in embodiments in which the evaluator comprises an autoencoder, aggregating values from the autoencoders can include applying a weighting value to at least some of the values received from the autoencoders. In some embodiments, the weighting value applied to the value received from the autoencoder is linked to the autoencoder from which that value was received.

In some embodiments, and after weighting some or all of the received values, the aggregator 204 can combine the weighted values. The aggregator 204 can, in some embodiments, determine whether to identify the traffic activity as anomalous or non-anomalous based on these weighted values. In some embodiments, this can include comparing the weighted values to a threshold. In embodiment in which the aggregated weighted values exceed the threshold, then the traffic activity can be identified as anomalous, and in embodiments in which the aggregated weighted values do not exceed the threshold, then the traffic activity can be identified as non-anomalous.

The data evaluator 114 can further include an anomalous activity identifier 206, also referred to herein as an identifier 206. In some embodiments, the identifier 206 can be configured to identify portions of one or several of the visual representations as corresponding to the anomalous activity and/or identify the source of the anomalous activity. In some embodiments, the identifier can identify the evaluators 202 indicating anomalous activity and/or the time at which the anomalous activity occurred. In some embodiments, based on the identified evaluators 202 and/or the identified time of the anomalous activity, the identifier can identify visual representations ingested by the evaluators 202 that indicated the anomalous activity and the portion of the visual representations that correspond to the time at which the anomalous activity was identified. In some embodiments, the identifier can provide all or portions of the visual representations that correspond to the anomalous activity. Thus, in some embodiments, the identifier 206 can identify a portion of the plurality of visual representations corresponding to the DDOS attack, and can provide the plurality of visual representations and/or the portion(s) of the plurality of visual representations to the user.

In some embodiments, the identifier 206, having identified the time of the attack, can identify data packets that were part of the attack. Having identified these data packets, the identifier can identify the source, and specifically the source IP address for those data packets. In some embodiments, the identifier 206 can thus identify the source, and specifically the source IP address of the attack. In some embodiments, the identifier 206 can take action to stop and/or block the attack. This can include, for example, blocking communications from the source IP address of the attack and/or directing the blocking of communications form the source IP address. In some embodiments, for example, the identifier 206 can direct the router 102 to block delivery of packets from the source IP address of the attack. In some embodiments, the use of a number of evaluators 202 can facilitate in identifying attributes of the anomalous traffic such as, for example, identifying the time of the anomalous traffic, the evaluator(s) 202 identifying the anomalous activity, or the like.

Figure 3:
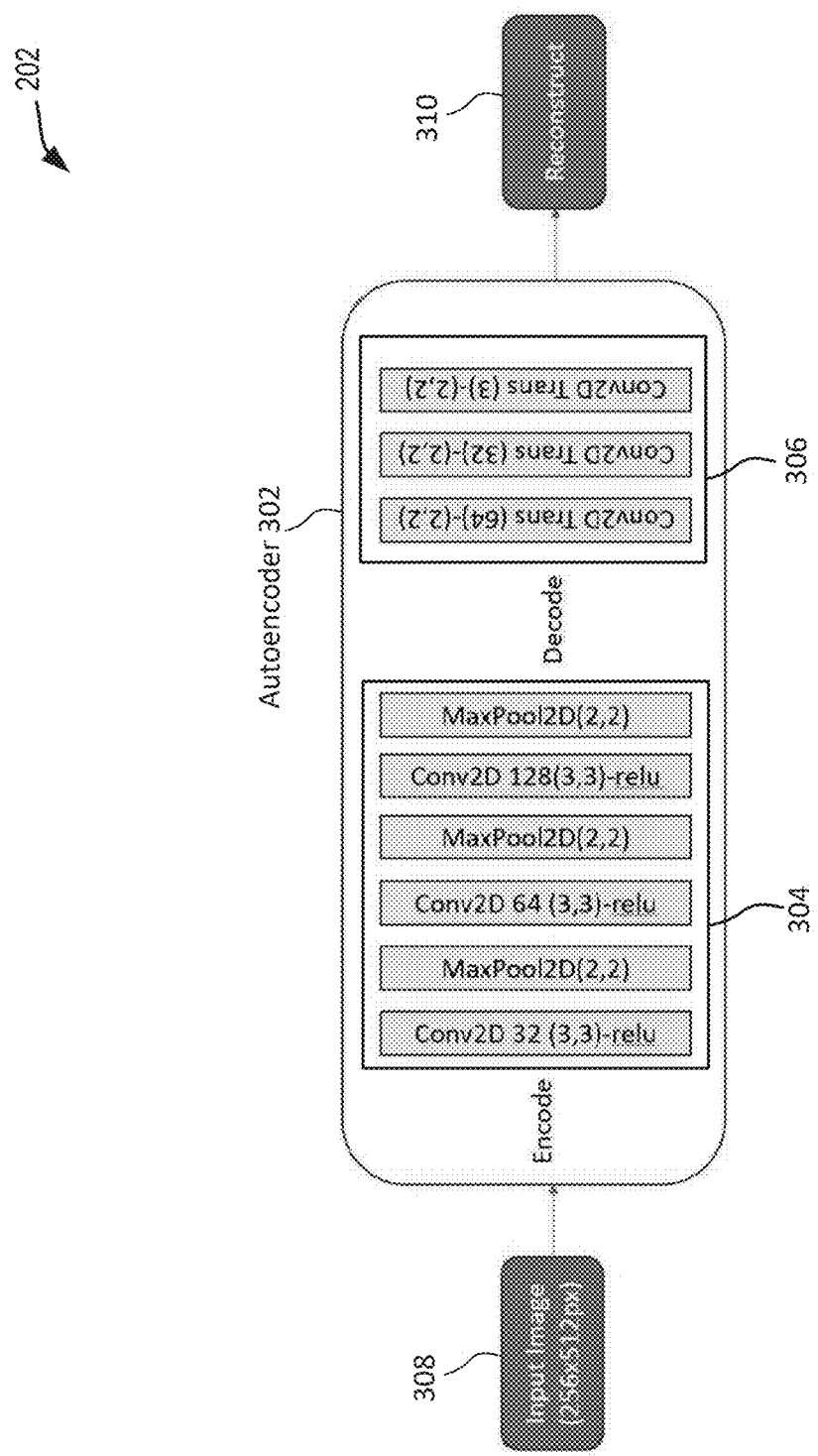
FIG. 3 is a schematic depiction of one embodiment of the evaluator comprising an autoencoder.

With reference now to FIG. 3, a schematic depiction of one embodiment of the evaluator 202 is shown, and specifically one embodiment of an autoencoder 300 is shown. In some embodiments, the autoencoder 300 can comprise a large number of layers, and in some embodiments, the autoencoder 300 can comprise a small number of layers. In some embodiments, for example, the autoencoder 300 can comprise 10 or fewer layers, 8 or fewer layers, 6 or fewer layers, 5 or fewer layers, 4 or fewer layers, 3 or fewer layers, 2 or fewer layers, or any other or intermediate number of layers. In some embodiments, the autoencoder can comprise a single encoding layer and a single decoding layer. In some embodiments, these layers can include one or several convolution layers, one or several maximum pooling layers, one or several transposed convolutional layers, or the like.

The plurality of layers of the autoencoder 300 can be organized into a first set of encoding layers 304 and a second set of decoding layers 306. In some embodiments, the first set of encoding layers 304 can include one or more convolution layers, one or more maximum pooling layers, or the like. In some embodiments, the second set of decoding layers 306 can include one or more transposed convolutional layers.

In some embodiments, the autoencoder 300 can receive the visual representation 308, and can pass the visual representation through the encoding layers 304 followed by the decoding layers 306. Based on a comparison of the output of the decoder and the visual representation 308, a reconstruction error 310 can be calculated. This reconstruction error 310 can be compared to a threshold value. Based on the results of this comparison, the autoencoder 300 can identify the traffic as anomalous or as non-anomalous.

In some embodiments, the autoencoder 300 can generate and/or output the value in form of a vector. In some embodiments, this vector can have between 1 and 100 elements, can have less than 50 elements, can have less than 20 elements, can have less than 10 elements, can have between 2 and 4 elements, or can have any other or intermediate number of elements.

With reference now to FIG. 4, a depiction of embodiments of the visual representation 308 is shown. In the embodiment of FIG. 4, each of the visual representations characterizes traffic flow in Gigabytes per second on the y-axis and time on the x-axis. Further, each visual representation contains multiple streams of data, which can, in some embodiments, each correspond to a different packet source, packet destination, or the like. Specifically, as depicted in FIG. 4, (A) depicts a first visual representation 308-A at a first time frame and (B) depicts a second visual representation 308-B at a second time frame. In the depicted embodiment, the time frame of (A) is shorter than the time frame of (B). Both (A) and (B) contain data 402 indicative of anomalous activity. Due to the difference in time frames, the data 402 in each of the visual representations has a different appearance. Specifically, the peak of data 402-B in (B) is more drastic than the peak of data 402-A in (A). In some embodiments, the use of a number of small, and relatively simple evaluators 202, and specifically the use of small, and relatively simple autoencoders 300 can provide better and more accurate results than would be achieved using larger and relatively more complex evaluators 202 and/or autoencoders 300. In some embodiments, this improved performance can be achieved due to the differences in appearance of anomalous traffic in different time frames as shown in (A) and (B).

Figure 5:
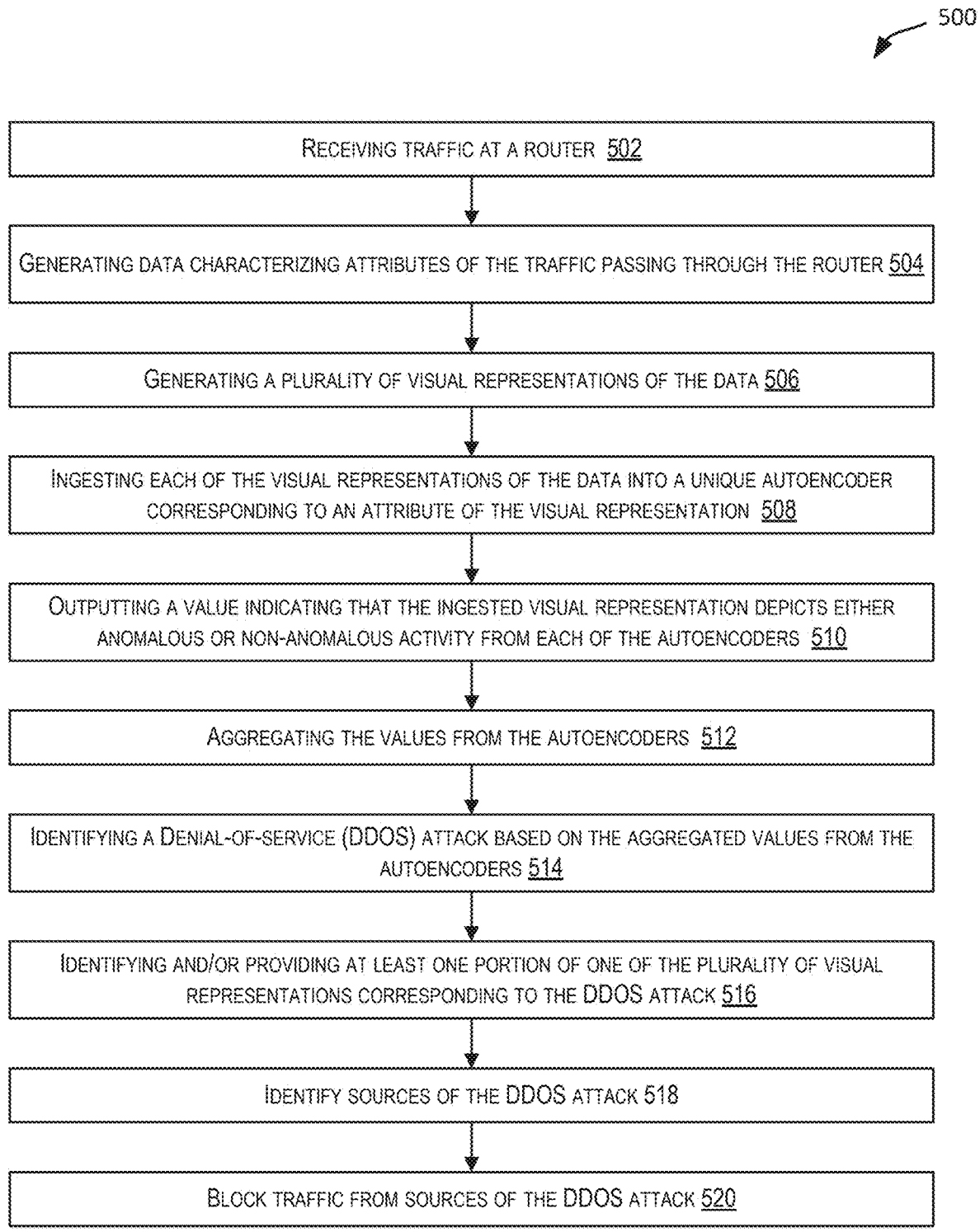
FIG. 5 is a flowchart illustrating one embodiment of a process for anomaly detection.

With reference now to FIG. 5, a flowchart illustrating one embodiment of a process 500 for anomaly detection is shown. The process 500 can, in some embodiments, be performed by all or portions of system 100. The process 500 begins at block 502, wherein traffic is received at a router 102. This router can, in some embodiment, a comprise a BGP router 102. The router 102 can connect a plurality of instances 104 contained in a network with another network. In some embodiments, the router 102 can connect the addresses, such as IP addresses, of the instances with another network, such as with a public network which can be, for example, the internet. The traffic received by the router 102 can be inbound traffic, outbound traffic, a combination of inbound traffic and outbound traffic, and/or the like.

At block 504, data characterizing attributes of the traffic passing through the router 102 is generated. In some embodiments, this data can be generated by the router 102 and provided to the data processor 110, or this data can be generated by the data processor 120. The traffic passing through the router 102 can be inbound traffic, outbound traffic, a combination of inbound traffic and outbound traffic, and/or the like.

At block 506, a plurality of visual representations of the data are generated. In some embodiments, each of the plurality of visual representations can be generated by the data processor 120. In some embodiments, each of the visual representations can comprise a graph, and specifically a time-series graph. In some embodiments, one or several visual representations can be generated for each of a plurality of time frames and/or for each of a plurality of attributes and/or variables of the traffic through the router 102. Thus, in some embodiments, each of the visual representations is generated for one of a plurality of predetermined time frames.

At block 508, each of the visual representations is ingested into one of a plurality of evaluators 202. In some embodiments, the evaluators 202 can each comprise an autoencoder 300. In some embodiments, each of the visual representations can be ingested into a unique autoencoder 300, or in other words, can be ingested into an autoencoder 300 configured for the time frame and/or attributes of the visual representation.

In some embodiments, an autoencoder 300 can be configured for a time frame and/or for attributes of a visual representation via training of that autoencoder 300 for that time frame and/or for the attributes of the visual representation. Specifically, in some embodiments, an autoencoder can be trained for a specific time frame and/or for specific attributes and/or variables of the ingested visual representation. In some embodiments, the autoencoder 300 can be trained with data using actual, previously collected data for inbound and/or outbound traffic through the router 102 and to the instances 104 having traffic being presently monitored. Thus, the autoencoder 300 can be trained using actual traffic data for the instances 104 to be monitored by the autoencoder 300.

In some embodiments, the plurality of autoencoders can include a subset of autoencoders each corresponding to the same time frame. In other words, a plurality of autoencoders can be configured to evaluate visual representations for the same time frame. In some embodiments, each of the subset of autoencoders is trained to output a value indicating that the ingested visual representation contains one of anomalous activity or non-anomalous activity for a unique attribute of traffic passing through the router 102. Thus, although each of the autoencoders in this subset of autoencoders is trained for the same time frame, each is trained to evaluate different attributes of traffic passing through the router 102 in that common time frame.

In some embodiments, some or all of the autoencoders 300 can comprise 3 or fewer layers. In some embodiments, some or all of the autoencoders 300 can include a single encoding layer and a single decoding layer. In some embodiments, some or all of the autoencoders 300 can generate and output a vector having between 2 elements and 4 elements.

At block 510 each evaluator 202, and specifically each autoencoder 300 outputs a value or vector indicating that ingested visual representation depicts either anomalous or non-anomalous activity. In some embodiments, this vector can have between 2 elements and 4 elements.

At block 512, the values or vectors from the evaluators 202 and specifically from the autoencoders 300 are aggregated by the aggregator 204. In some embodiments, this aggregation of values can further include identifying a weighting value for each of the evaluators 202 and specifically for each of the autoencoders 300 and applying that weighting to the value or vector received from the corresponding evaluator 202 or autoencoder 300 to generate a weighted value for each of the received values or vectors. In some embodiments, the weighted values can be aggregated, or in other words, can be combined.

At block 514, a DDOS attack is identified based on the aggregated values. In some embodiments, this can include the aggregator 204 comparing the aggregated values to one or several thresholds. In some embodiments, the aggregator 204 can designate the traffic as anomalous or as non-anomalous based on the comparison of the aggregated values to the one or several thresholds.

At block 516, the identifier 206 identifies and/or provides at least one portion of at least one visual representation as corresponding to the DDOS attack, or in other words the identifier 206 identifiers at least one portion of at least one visual representation as corresponding to anomalous activity, and provides that at least one portion of at least one visual representation to the user. In some embodiments, this can include identifying evaluators 202 identifying anomalous activity, identifying the time of anomalous activity, and providing portions of the visual representations ingested into the evaluators 202 identifying the anomalous activity that correspond to the time of the anomalous activity.

At block 518, the identifier 206 identifies sources of the DDOS attack. This can include identifying packets involved in the DDOS attack, and identifying the source IP addresses of those packets.

At block 520 traffic from sources of the DDOS attack is blocked. In some embodiments, this can include the identifier 206 block the traffic from sources of the DDOS attack, either directly or indirectly by controlling the router 102 to block traffic from sources of the DDOS attack. In some embodiments, blocking traffic from sources of the DDOS attack can include blocking traffic from IP addresses from which packets forming the DDOS attack came via the router 102.

Exemplary Implementation

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
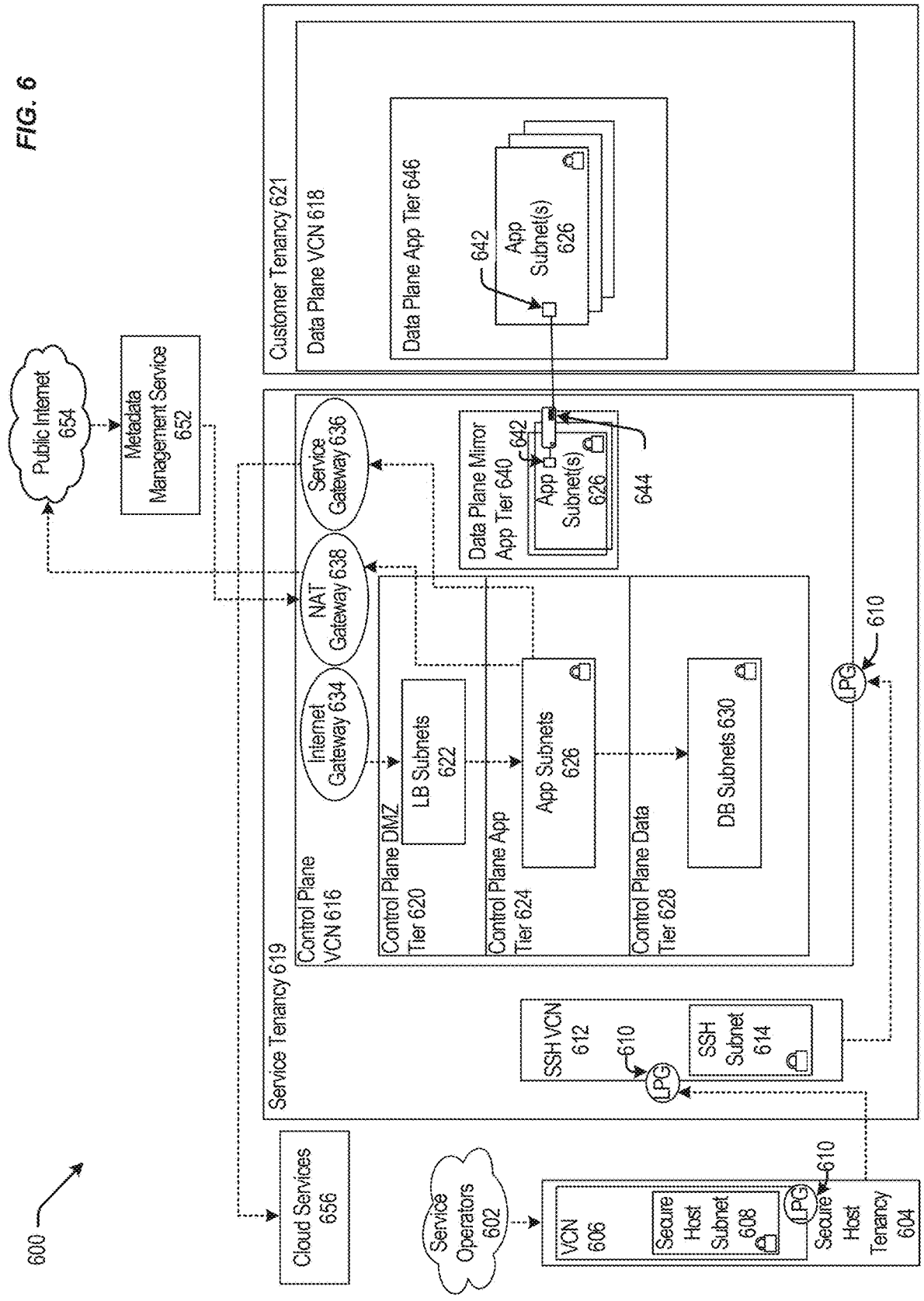
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively coupled to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
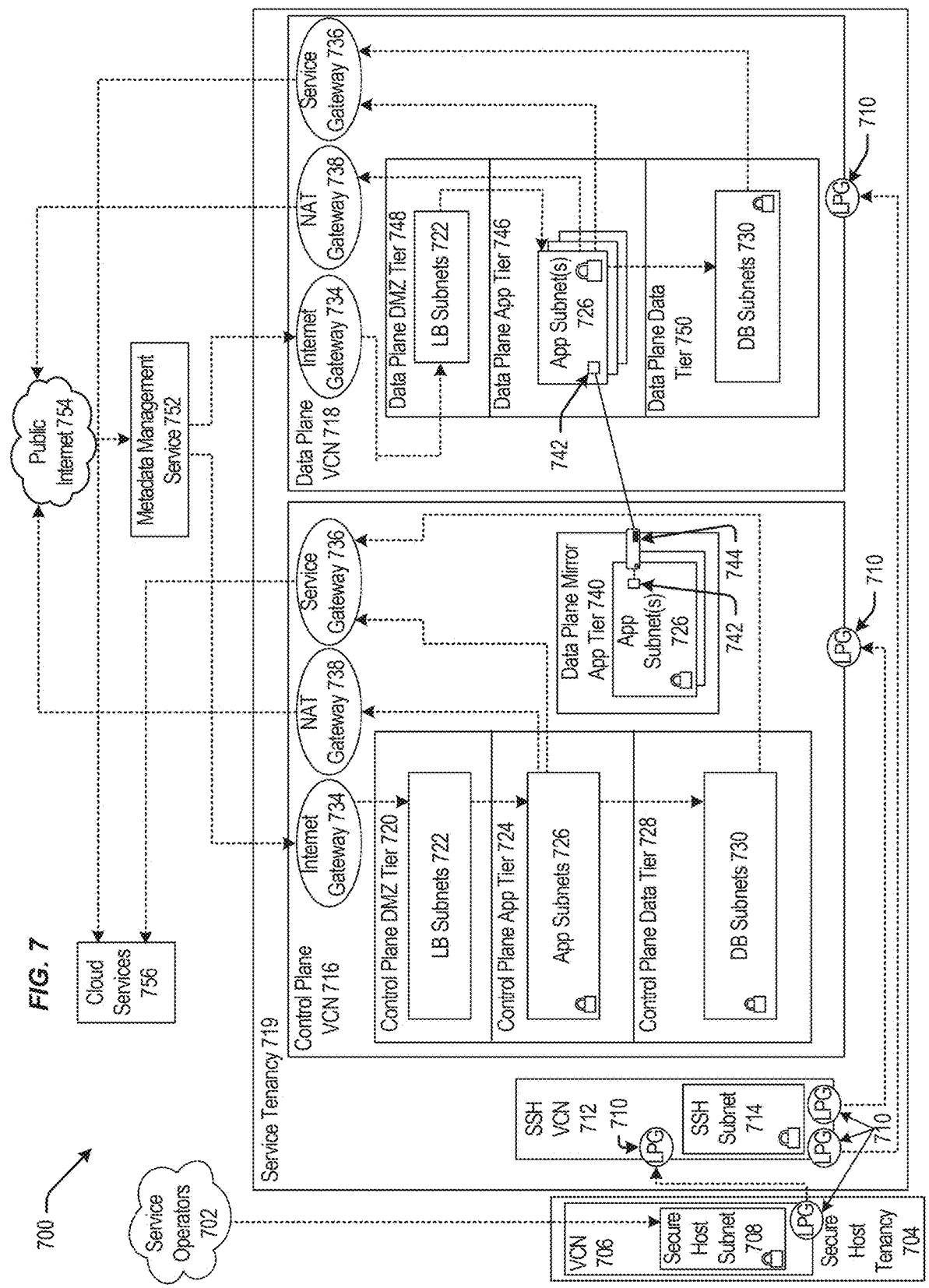
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively coupled to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
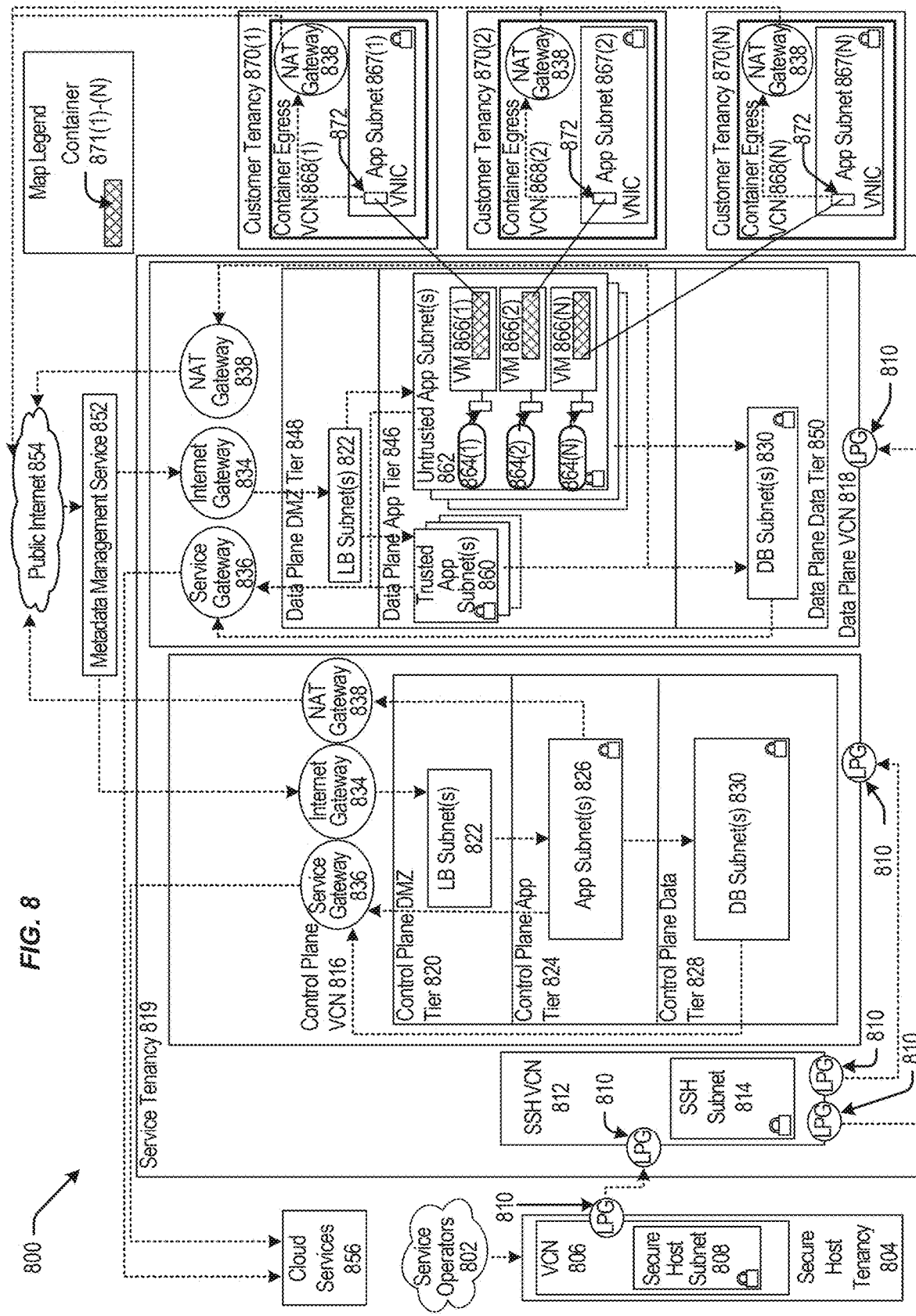
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
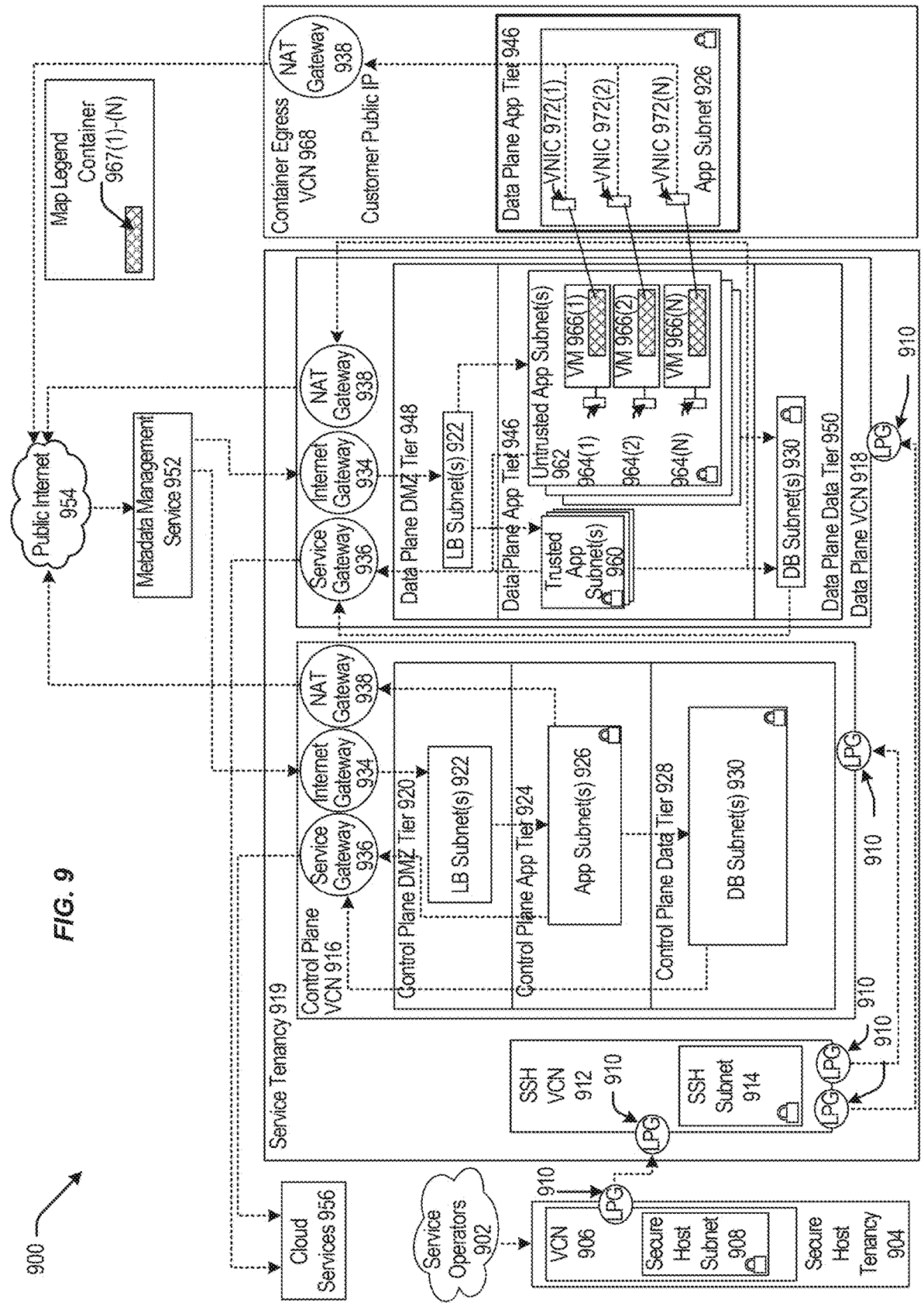
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane VCN 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
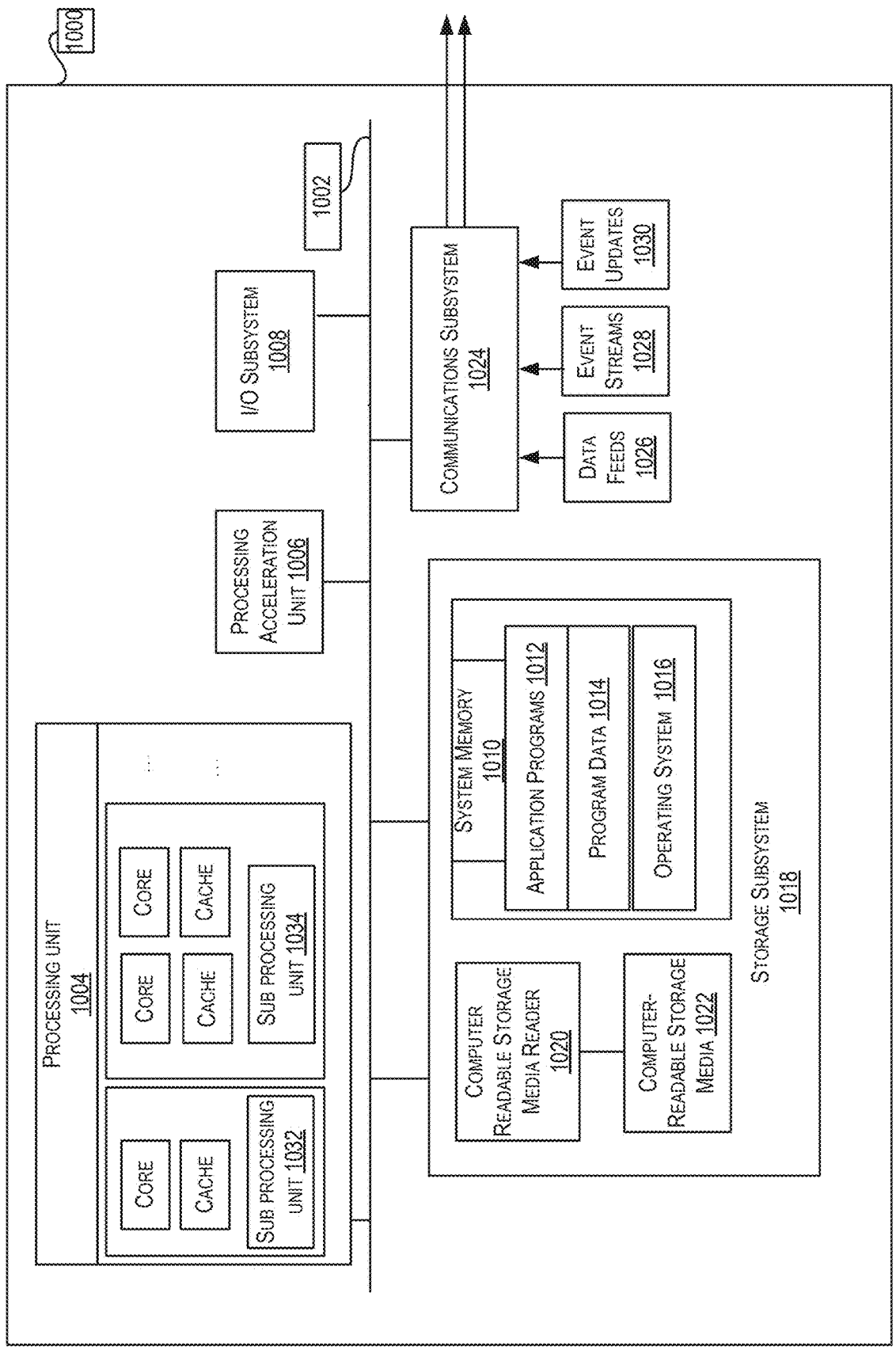
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
generating data from a router connecting a plurality of IP addresses in at least one network to a public network, the data characterizing attributes of traffic passing through the router;
generating a plurality of visual representations of the data, each of the plurality of visual representations of the data is generated for one of a plurality of predetermined time frames;
ingesting each of the visual representations of the data into a unique autoencoder corresponding to the time frame of the ingested visual representation, the autoencoder trained to output a value indicating that the ingested visual representation contains one of anomalous activity or non-anomalous activity;
aggregating the values from the autoencoders; and
identifying a Denial-of-service (DDOS) attack based on the aggregated values from the autoencoders.

2. The method of claim 1, wherein the autoencoder is trained for the predetermined time frame of the ingested visual representation.

3. The method of claim 1, wherein the autoencoders comprise at least one of: a convolutional neural network (CNN) autoencoder; or a Long Short-Term Memory (LSTM) autoencoder.

4. The method of claim 1, wherein each of the plurality of visual representations of the data comprises a time series graph.

5. The method of claim 1, wherein each of the autoencoders is trained on data characterizing the attributes of traffic passing through the router and to the plurality of IP addresses.

6. The method of claim 1, wherein the traffic passing through the router comprises inbound traffic.

7. The method of claim 1, wherein the traffic comprises outbound traffic.

8. The method of claim 1, wherein the traffic comprises both inbound traffic and outbound traffic.

9. The method of claim 1, wherein aggregating the values from the autoencoders comprises applying a weighting value to at least some of the values from the autoencoders.

10. The method of claim 9, wherein the weighting value applied to a value from an autoencoder is linked to that autoencoder.

11. The method 1, wherein at least some of the autoencoders are trained to identify anomalous activity and at least some of the autoencoders are trained to identify normal activity.

12. The method of claim 1, wherein the time frames comprise at least: a first time frame of between 1 second and 59 minutes; a second time frame of between 1 hour and 24 hours; a third time from of between 1 day and 7 days; and a time frame of at least one week.

13. The method of claim 1, wherein the attributes of traffic passing through the router comprises at least one of: a packet size; a packet distribution; a bandwidth; packet protocol distribution; packet sources; or packet destinations.

14. The method of claim 1, further comprising: identifying a portion of the plurality of visual representations corresponding to the DDOS attack; and providing the visual representations to a user.

15. The method of claim 1, wherein the plurality of IP addresses comprises between 255 and 65,000 IP addresses.

16. The method of claim 1, wherein each of the autoencoders comprises 3 or fewer layers.

17. The method of claim 1, wherein each of the autoencoders generates a vector having between 2 and 4 elements.

18. The method of claim 1, wherein the autoencoders comprise a subset of autoencoders each corresponding to the same time frame, wherein each of the subset of autoencoders is trained to output a value indicating that the ingested visual representation contains one of anomalous activity or non-anomalous activity for a unique attribute of traffic passing through the router.

19. A system comprising:
memory comprising processor-executable stored instructions; and
a processor configured to execute the stored instructions to:
generate data from a router connecting a plurality of IP addresses in at least one network to a public network, the data characterizing attributes of traffic passing through the router;
generate a plurality of visual representations of the data, each of the plurality of visual representations of the data is generated for one of a plurality of predetermined time frames;
ingest each of the visual representations of the data into a unique autoencoder corresponding to the time frame of the ingested visual representation, the autoencoder trained to output a value indicating that the ingested visual representation contains one of anomalous activity or non-anomalous activity;
aggregate the values from the autoencoders; and
identify a Denial-of-service (DDOS) attack based on the aggregated values from the autoencoders.

20. A non-transitory computer-readable storage medium storing a plurality of instructions executable by one or more processors, the plurality of instructions when executed by the one or more processors cause the one or more processors to:
generate data from a router connecting a plurality of IP addresses in at least one network to a public network, the data characterizing attributes of traffic passing through the router;
generate a plurality of visual representations of the data, each of the plurality of visual representations of the data is generated for one of a plurality of predetermined time frames;
ingest each of the visual representations of the data into a unique autoencoder corresponding to the time frame of the ingested visual representation, the autoencoder trained to output a value indicating that the ingested visual representation contains one of anomalous activity or non-anomalous activity;
aggregate the values from the autoencoders; and
identify a Denial-of-service (DDOS) attack based on the aggregated values from the autoencoders.

* * * * *